United States Patent [19]

Raychaudhuri et al.

[11] Patent Number: 5,684,791

[45] Date of Patent: Nov. 4, 1997

[54] DATA LINK CONTROL PROTOCOLS FOR WIRELESS ATM ACCESS CHANNELS

[75] Inventors: Dipankar Raychaudhuri, Princeton Junction; Hai Xie, Highland Park; Ruixi Yuan, Plainsboro, all of N.J.

[73] Assignee: NEC USA, Inc., Princeton, N.J.

[21] Appl. No.: 553,168

[22] Filed: Nov. 7, 1995

[51] Int. Cl.$^6$ .............................. H04B 7/212; H04L 12/56
[52] U.S. Cl. ..................... 370/278; 370/280; 370/349; 370/395
[58] Field of Search ................... 370/278, 280, 370/336, 337, 345, 349, 352, 358, 389, 391, 392, 395

[56] References Cited

PUBLICATIONS

Raychaudhuri and Wilson, "ATM-Based Transport Architecture for Multiservices Wireless Personal Communication Networks," IEEE Jrnl Sel Areas Comm, vol. 12, No. 8, pp. 1401-1414 Oct. 1994.

D. Raychaudhuri et al., "ATM-Based Transport Architecture for Multiservices Wireless Personal Comunication Networks," in IEEE JSAC, vol. 12, Oct. 1994, pp. 1401-1414.

D. Raychaudhuri et al., "ATM-Based Transport Architecture for Multiservices Wireless Personal Comunication Networks," in Proc. From 1994 IEEE Intl. Conf on Communications, May 1-5, pp. 559-565.

Primary Examiner—Douglas W. Olms
Assistant Examiner—Matthew C. Phillips
Attorney, Agent, or Firm—Philip J. Feig

[57] ABSTRACT

A data link control procedure for wireless ATM access channels based on a dynamic TDMA/TDD framework provides integrated ATM services including available bit-rate (ABR) data and constant/variable bit-rate (CBR/VBR) voice or video through the addition of wireless-specific medium access control and data link control protocol layers between the physical and ATM network layers. Generally, a data link control is used to insulate the ATM network layer from wireless channel impairments by selective retransmission of erroneous or lost cells before they are released to the ATM layer. The data link control methods disclosed use the on-demand ABR burst transmission capability of the dynamic TDMA channel to retransmit unacknowledged cells in available slots not allocated to service data. Specific error recovery procedures for both (asynchronous) ABR and (isochronous) CBR services are provided.

5 Claims, 15 Drawing Sheets

DATA LINK CONTROL PROTOCOLS FOR WIRELESS ATM ACCESS CHANNELS

FIELD OF THE INVENTION

The present invention relates to wireless ATM systems, and specifically to data link control (DLC) protocols intended for error control on a wireless access line. The DLC protocols may be incorporated as a sublayer within the ATM (asynchronous transfer mode) protocol stack, enabling seamless ATM cell-relay operation over both wireless (radio) and fiber optic links. The DLC protocols are applicable for both available bit-rate (ABR) and constant/variable bit-rate (CBR/VBR) services supported by a wireless ATM system.

BACKGROUND OF THE INVENTION

Next-generation personal communication networks will be required to co-exist with fiberoptic based broadband communication networks, which should become far more ubiquitous in the near future. These broadband systems (such as B-ISDN/ATM and ATM LAN) will offer constant bit-rate (CBR), variable bit-rate (VBR), available bit-rate (ABR) and packet transport services designed to support a range of voice, data, video, and multimedia applications. In order to avoid a serious mismatch between future wireline and wireless networks, it is necessary to consider broadband wireless systems with similar service capabilities. Wireless personal communication networks introduced into the future multimedia application scenario should provide new service features such as high-speed transmission, flexible bandwidth allocation, VBR/CBR/packet modes, quality-of-service (QoS) selection, and so forth.

In an article by D. Raychaudhuri et al entitled "ATM-based transport architecture for multiservices wireless personal communications networks" in IEEE JSAC, vol. 12, pp. 1404–1414, October 1994 and in an article by D. Raychaudhuri entitled "ATM-based transport architecture for multiservices wireless personal communications networks" in Proc. ICC '94, pp. 317.11-7, 1994, an architecture for a wireless ATM system is proposed. This proposed system is intended to provide mobile terminals with high-speed cell relay services qualitatively similar to those provided by future B-ISDN/ATM, thereby facilitating seamless support of network-based multimedia applications on both fixed and portable terminals. Wireless ATM may be viewed as a general solution for next-generation personal communication networks (PCN) which will be required to support multimedia. The proposed system is intended to be an integral part of a high-speed ATM network with unified wired and wireless services via standard ATM network and signaling/control layers, augmented to support mobility. In order to maintain uniformity of service classes and quality-of-service (QoS) parameters, the wireless network is designed to support standard ATM service interfaces including ABR (available bit-rate), CBR (constant bit-rate), and VBR (variable bit-rate). Quantitative limits on bit-rate, cell loss, delay, etc. may be imposed by the limitations of the radio medium.

There are several basic problems that must be addressed for the development of multimedia-capable personal communication networks, including:

1. High-speed radio transmission consistent with service requirements of future terminals. Typical video and multimedia services may require transmission bit-rates of approximately 10–25 Mbps, a channel speed that is significantly higher than that being considered for first-generation wireless systems.

2. Medium access control (MAC) methods that provide relatively transparent multiservices capabilities similar to B-ISDN over the inherently shared wireless medium. Service classes to be supported include constant bit-rate (CBR), variable bit-rate (VBR) and packet data, each with reasonable quality-of-service parameters.

3. Wireless data link control (DLC) protocols for interfacing the relatively unreliable high-speed radio links to the fixed broadband (ATM) network with a minimum of protocol conversion.

4. Signaling, location management and transport protocol modifications necessary to support mobility and new personal communication services in the wireless network.

This invention concerns data link procedures for wireless ATM access channels based on a dynamic TDMA (time division multiple access)/TDD (time division duplexing) framework. The system provides integrated ATM services including available bit-rate (ABR) data and constant/variable bit-rate (CBR/VBR) voice or voice through the addition of wireless-specific medium access control (MAC) and data link control (DLC) protocol layers between the physical and ATM network layers.

The DLC protocol layer is intended to insulate the ATM network layer from wireless channel impairments by selective retransmission of erroneous or last calls before they are released to the ATM layer. The proposed DLC methods exploit the on-demand ABR burst transmission capabilities of the dynamic TDMA channel to retransmit unacknowledged cells in available slots not allocated to service data.

SUMMARY OF THE INVENTION

In prior U.S. patent application Ser. No. 08/495,164, now U.S. Pat. No. 5,638,371, filed Jun. 27, 1995, entitled "Multiservices Medium Access Control Protocol for Wireless ATM Systems", assigned to the same assignee as the present invention and which is incorporated herein by reference, there is described a medium access control method for wireless ATM access links utilizing the channel access facilities provided by the MAC protocol described in the patent application. Taken together with the MAC protocol sublayer and the DLC protocol sublayer of the present invention permit seamless connections between fixed and wireless segments of an ATM network.

In accordance with the teachings of the present invention, a wireless ATM is disclosed which provides error control for a data link control (DLC) protocol layer ATM ABR (available bit-rate) and CBR/VBR (constant/variable bit-rate) services supported by the wireless ATM access system described in patent application Ser. No. 08/491,564.

A 48 byte ATM cell is the basic unit of data within both wired and wireless network segments. The ATM header itself is maintained for network and higher level services in the wireless segment. Wireless channel specific protocol layers (specifically data link control (DLC) and medium access control (MAC) layers) are added to ATM cells as required, and are replaced by standard ATM headers before entering the fixed network. The MAC and DLC protocol layers may be incorporated into a standard ATM protocol stack to provide seamless ATM services over the shared/unreliable radio access channel.

A typical system-level implementation for the wireless ATM access segment includes a wireless ATM network interface unit (WATM NIU) which is responsible for the wireless physical, MAC and DLC functions of the wireless protocol layers. The WATM NIU is connected to either a remote terminal or a base station which provides normal ATM functions with required mobility enhancements. The remote terminal presents a standard ATM API (application programming interface) to the user process on the remote terminal, providing the usual service classes (e.g. ABR, VBR, CBR) and parameters. Applications currently working over wired ATM will continue to work transparently over the wireless link, with radio channel specific functions (MAC and DLC) handled by the WATM NIU's at the terminal and base station.

The present invention resides in the novel data link control (DLC) layer protocol for ABR ATM virtual circuits and CBR ATM virtual circuits.

The data link control protocol for the ABR mode is based on wireless ATM specific extensions to ARQ (automatic repeat request) protocols previously used in packet networks. The present invention incorporates novel aspects related to ATM and radio channel medium access control. These novel aspects include the use of a new ACK (control) packet with mode selection, reference cell sequence number and group ACK bit-map and the provision of a direct interface to the MAC layer for pre-allocation of channel slots for uplink retransmission (for speeding up the DLC process).

The data link control protocol for the CBR (or VBR) mode provides a novel "time-constrained" ARQ procedure with an on-demand ABR mode side channel supported by the wireless ATM MAC layer. Note, in following text only the term CBR is used for convenience. It will be apparent to those skilled in the art that similar techniques are applicable to VBR mode. In the present invention, a fixed delay FIFO (first-in, first-out) buffer is used to store a quantity of ATM cells not exceeding a specified end-to-end delay, while providing a T seconds window during which retransmission may be attempted. The result is that output of the DLC process continues to appear as a CBR data stream with low cell delay variance (CDV), where most (but not necessarily all) errors are corrected.

A key provision of the invention is the use of an on-demand ABR mode to retransmit erroneous CBR cells. This avoids the customary problem associated with CBR data link controls, in which retransmissions tend to reduce the bit-rate delivered to the user from the nominal bit-rate value. In accordance with the teachings of the present invention, the on-demand capacity of ABR mode is used for the parallel retransmission of erroneous CBR cells which are then merged with the original CBR data in the receive FIFO buffer. Also, similar to the ABR DLC protocol, there is a direct link to the MAC layer for pre-allocation of the necessary ABR slots for retransmission.

The present invention provides a wireless ATM DLC protocol for error control, together with a closely related MAC sublayer for channel access control.

Further and still other advantages of the present invention will become more clearly apparent when the following description is read in conjunction with the accompanying drawing.

DETAILED DESCRIPTION OF THE INVENTION

Figure 1:
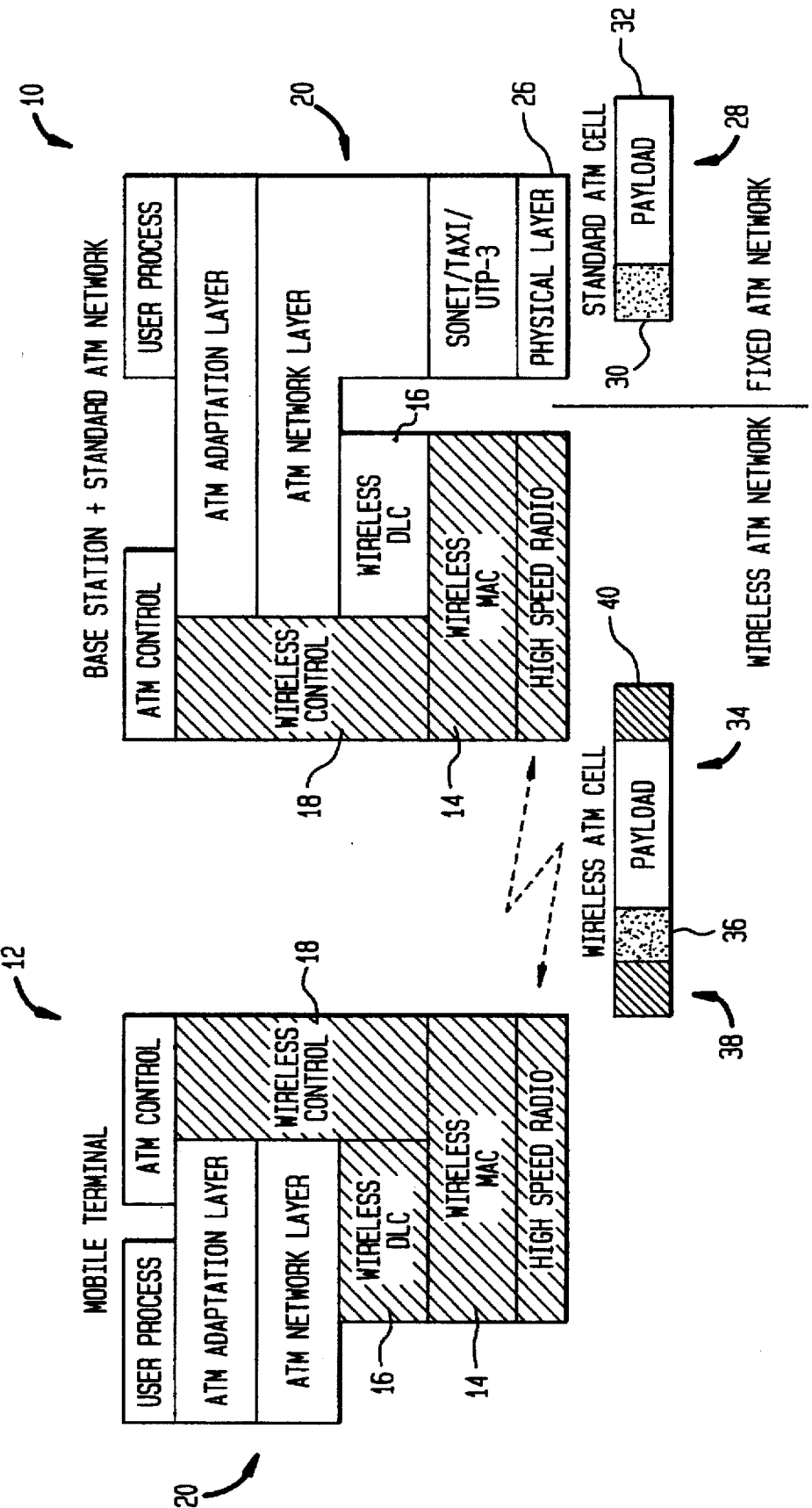
FIG. 1 is a schematic representation of the interface between a fixed and a wireless ATM network.

The basic approach to wireless ATM, as described in Raychaudhuri et al, supra, is to use a standard ATM cell for network level functions, while a wireless header/trailer is added on the radio link for wireless channel specific protocol layers—Medium Access Control (MAC), Data Link Control (DLC), and wireless network control. Referring now to the figures and to FIG. 1 in particular, there is shown an interface between a fixed network 10 and a wireless network 12. ATM services with QOS requirements are provided on an end-to-end basis with standard ATM signaling functions being terminated at a mobile unit of a wireless network. The protocol layering in wireless ATM is harmonized with that of standard ATM. As shown in FIG. 1, new wireless channel specific MAC 14, DLC 16 and wireless network control layers 18 are incorporated into the ATM protocol stack 20. A limited number of mobility extensions to ATM network and control layers will be required to support additional functions such as location management, handoff, QoS specification/renegotiation, etc.

In order to overcome the effects of the inherent high error rate associated with the radio channel, a new data link control (DLC) is used in wireless ATM to provide an additional layer of error protection to ATM services. DLC protocols are not only applied to packet-mode ABR services, but also to stream-mode CBR and VBR services, with the retransmission schemes matched to the requirements of the individual service classes. For example, no intrinsic time delay constraints need to be applied to error recovery procedures for ABR services, while for the CBR and VBR services, the DLC must maintain acceptable isochronous throughput and delay in the cell stream passed up to the ATM layer.

Figure 2:
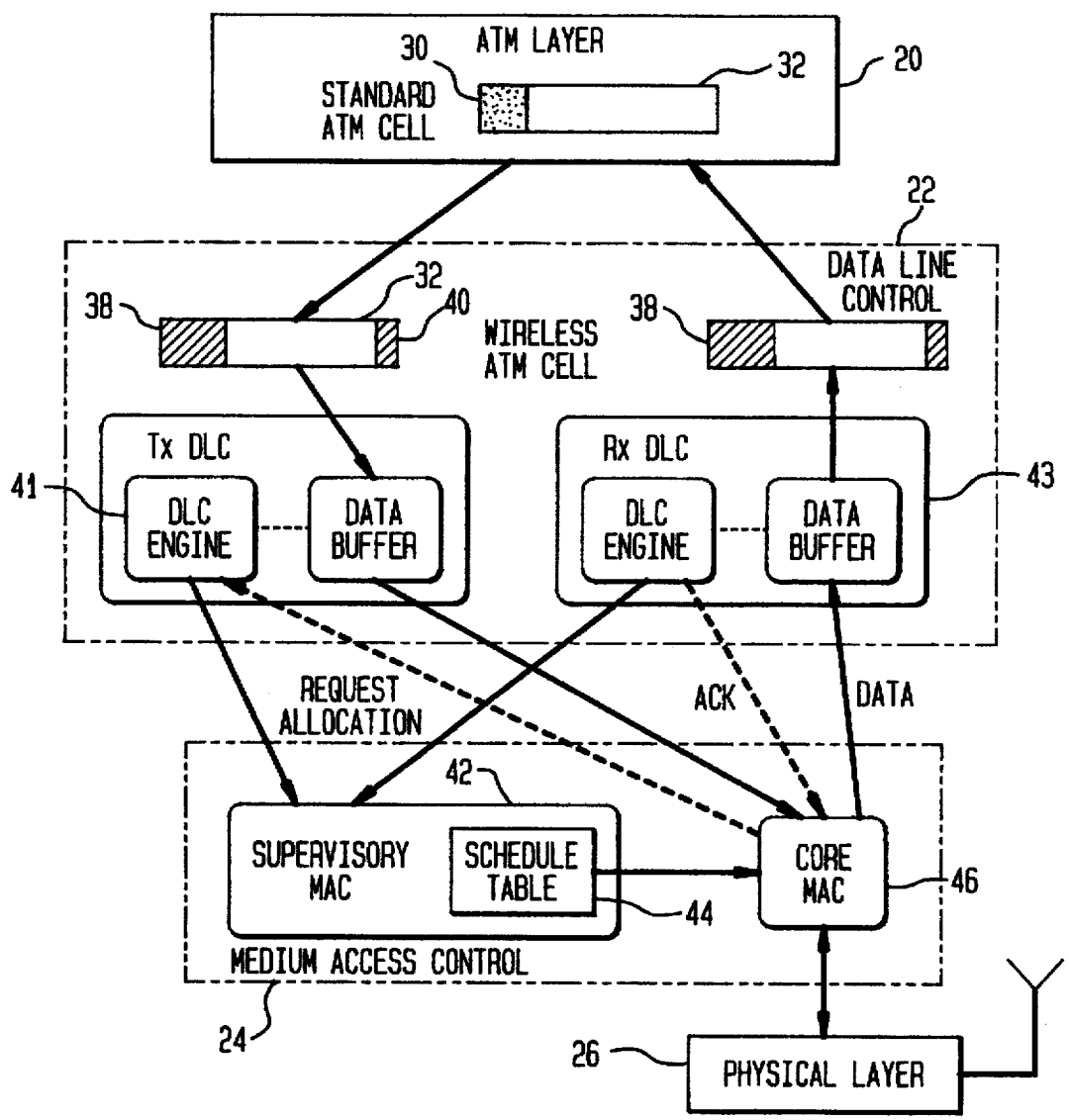
FIG. 2 is a schematic representation of a preferred data link control protocol layer and medium access control protocol layer.

FIG. 2 shows the architecture of a preferred Data Link Control (DLC) protocol layer 22 and a Medium Access Control (MAC) protocol layer 24. Standard ATM cells arrive at the DLC layer corresponding to a particular virtual circuit (VC). FIG. 1 shows a standard ATM cell 28 containing a standard ATM header 30 and the data or payload 32 to be transmitted. At the remote terminal, the wireless ATM cell 34 contains the standard/truncated ATM header 36 and the payload. In addition, the wireless ATM cell also includes a wireless link header 38 and a CRC (Cyclic Redundancy Check) 40. A Tx DLC 41 performs the functions of replacing the standard ATM header 30 with the wireless ATM (WATM) header 38 and requesting Supervisory MAC (S-MAC) 42 to allocate slots for the transmission of the cells. The S-MAC 42 schedules transmissions/receptions for a particular frame and passes a schedule table 44 to Core MAC (C-MAC) 46, which retrieves the cells from the corresponding Tx DLC 41 for transmission (or transfers the received cells to the Rx DLC 43 of the corresponding VC). When receiving cells, the DLC 22 transfers received cells (after any required error recovery) to the ATM layer 20 after replacing the WATM header 38 with the standard ATM header 30.

Figure 3A:
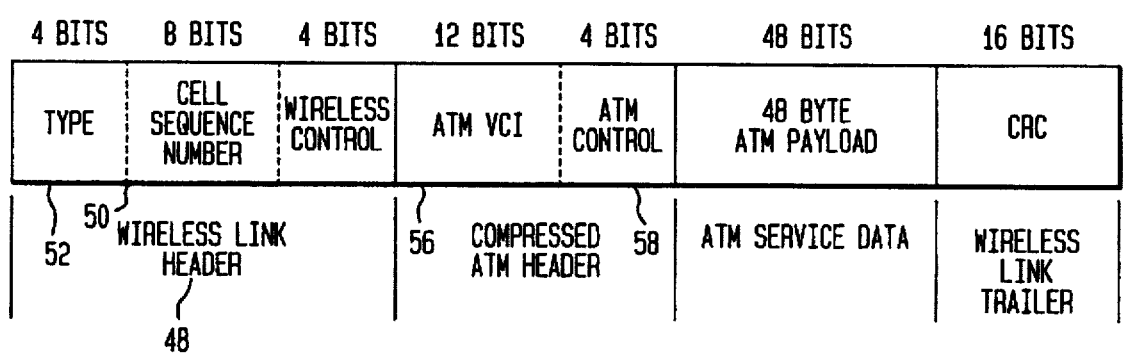
FIGS. 3A and 3B show a typical wireless ATM cell and a typical wireless ATM acknowledgement (ACK), respectively.

The cell format is harmonized with the standard ATM cell format. FIG. 3A shows a typical wireless ATM cell format including headers corresponding to the wireless ATM protocol stack shown in FIG. 1. The wireless link header 48 incorporates an 8-bit cell sequence number 50 to support DLC error recovery over moderately large bursts. This header also includes fields to enable other wireless network functions such as service type definition 52, handoff recovery, and cell segmentation. A 2-byte compressed ATM header is incorporated with 12 bits for VCI (virtual circuit identifier) 56 and 4 bits for ATM control 58. The header error control (HEC) function is not used on the radio link in view of a 2-byte CRC error detection provided by the DLC. Alternatively, the full 5-byte ATM header may also be retained if wireless channel efficiency is not too critical.

Figure 3B:
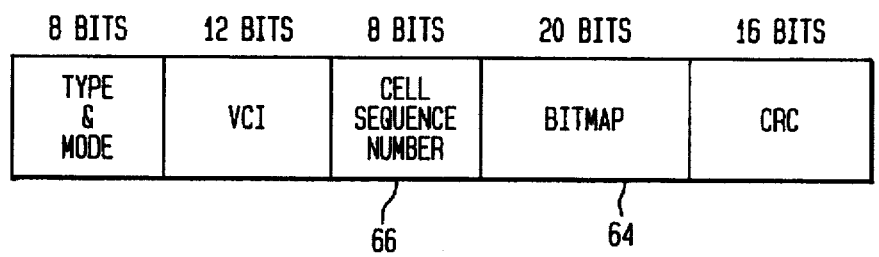

The preferred format of a wireless ATM acknowledgment (ACK) message is shown in FIG. 3B. A maximum of 20 cells can be acknowledged with a single WATM ACK message. A bitmap 64 of 20 bits in length is used to acknowledge cells offset from the cell sequence number (CSN) 66 contained in the ACK packet. This type of group ACK syntax is used to reduce the number of short ACK packets requesting channel access from the MAC layer, thereby improving efficiency.

Figure 4:
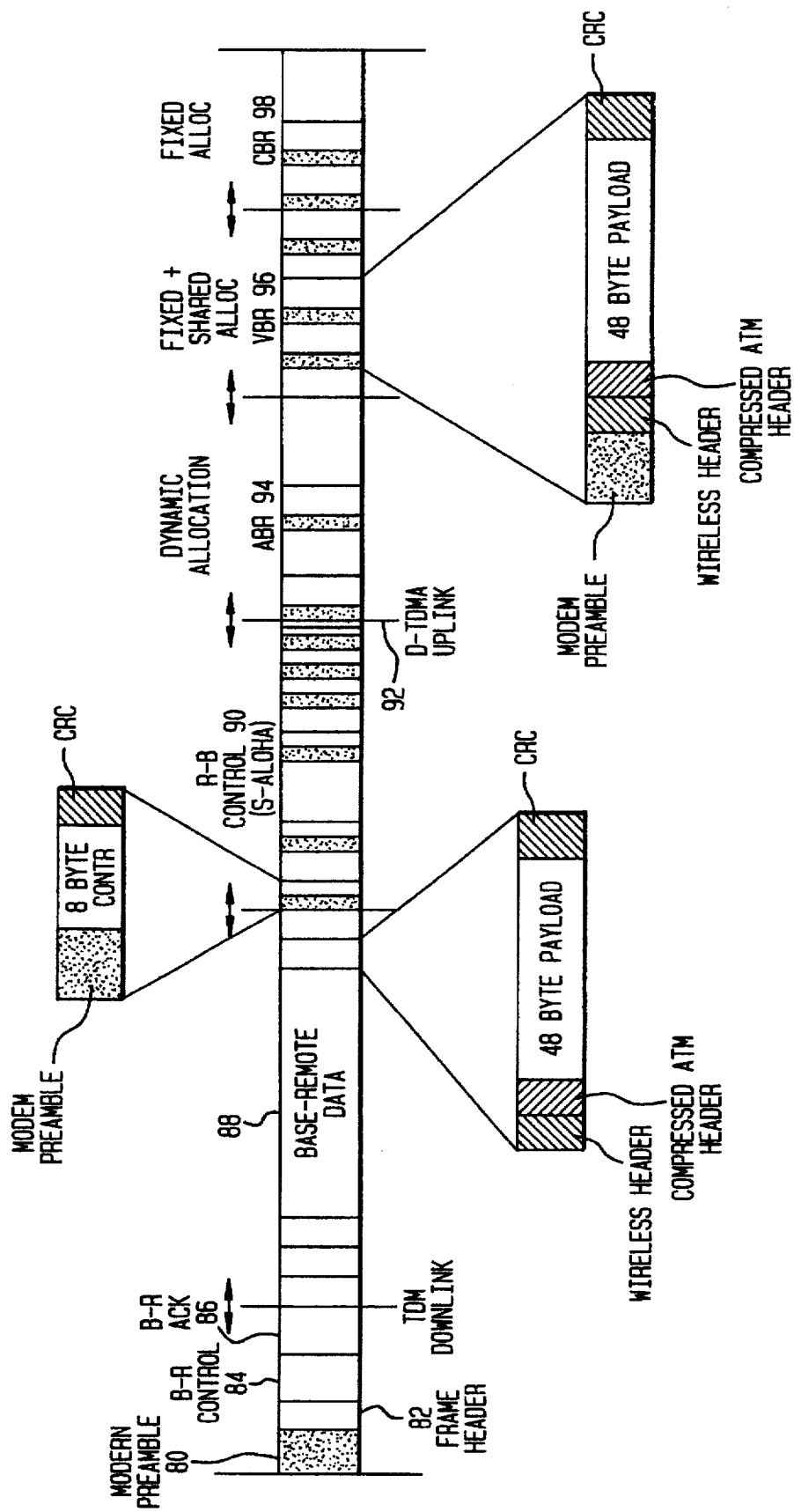
FIG. 4 shows a wireless TDM/TDMA channel format.

FIG. 4 shows a TDD/TDMA channel format that is used to support the different traffic classes. The channel frame contains downlink preamble, control, and data, followed by uplink control, ABR data, VBR data, and CBR data. Downlink transmissions are TDM multiplexed in a single burst from the base station to the remote stations, while uplink transmissions use dynamic TDMA. The boundaries between the subframes are varied gradually with time in order to support changing traffic needs.

A brief description of the different subframes and their functions is given below. The downlink preamble 80 provides frame synchronization as well as a training sequence for the purposes of equalization. The base station uses a frame header 82 to transmit its ID and information about the positions and sizes of the different subframes in the current frame. The downlink control messages, transmitted in the B-R control region 84, include allocation information, Base-to-Remote (B-R) acknowledgment information 86, and other wireless network control messages (for example, messages for power control, handoffs, etc.). The B-R data region 88 contains downlink data cells. The remote stations are informed about possible data cells to be received by them by via allocation messages transmitted in the B-R control region 84 (except in the case of CBR calls where the positions are static). The R-B control region 90 is used by the remote stations to transmit control messages to the base station. These control messages include slot allocation requests for R-B ABR bursts, wireless network control messages, etc. These messages are sent in a slotted ALOHA mode, where the remote stations randomly choose a slot to transmit their message and employ a backoff scheme to retransmit unsuccessful packets. The D-TDMA uplink data 92 and R-B acknowledgment messages are transmitted with the R-B data regions 94, 96, 98. The transmissions in this region are either allocated on a frame-by-frame basis (in the case of ABR transmissions, CBR/VBR retransmissions, and R-B acknowledgments) or pre-assigned in the case of CBR default allocations.

Medium Access Control (MAC)

Functionally, the MAC (FIG. 2) can be described as comprising two different components—a Supervisory MAC (S-MAC) 42 and a Core MAC (C-MAC) 46. The functions of these two components are described below.

The S-MAC can be thought of as the "intelligence" of the MAC layer. It processes control information and builds a 'schedule table' for the C-MAC in each frame. At the base station, the S-MAC is responsible for channel access scheduling, both uplink and downlink, (except for the R-B control region) for all the VCs (ABR/CBR/VBR) in the system. The S-MAC receives requests for slot allocation from the VCs present in the system. Subject to the fulfillment of QoS requirements of each VC, the S-MAC arrives at a policy of scheduling data transmissions and acknowledgments (to enable error recovery by the DLC). Call admission control (CAC) functions for the wireless link is also part of the base station S-MAC. At the remote station, the S-MAC processes the control information received in each frame in the B-R region and builds a schedule table for the C-MAC. It is also responsible for scheduling the transmission of the R-B control messages in the slotted ALOHA mode.

The C-MAC can be thought of as the interface between the DLC and the physical layer. Based on a schedule table supplied by the S-MAC, the C-MAC multiplexes/demultiplexes transmission and reception for the corresponding VCs. A schedule table entry, typically contains service type (transmission/reception), message type (data/control message), the VCI, the position and the duration of the service. The functions of the C-MAC at both the base station and the remote station is practically identical. The functions of the C-MAC make it suitable for fast hardware implementation.

CBR VCs are assigned slots periodically according to their bit-rate. A group of $M \geq 1$ frames (e.g. M=6) may constitute a MAC superframe, which is used to obtain a reasonable granularity for bit-rate assignments (e.g. N×32 Kbps). The positions of the assigned slots within a MAC superframe are maintained relatively static in order to facilitate operation of low complexity telephone terminals and also to reduce the control signaling load on the wireless link. Once the allocation for CBR calls are transmitted to the remote stations, they are assumed to remain in the same positions until they are explicitly changed by another allocation message by the base station. The positions of the slots for the CBR calls may need to be changed in order to achieve packing efficiency and lower the CBR call blocking probability. However, the time horizon over which such changes are effected is much longer than the duration of a MAC frame.

ABR virtual circuits are handled on a burst-by-burst basis with dynamic reservation of ABR slots and unused CBR/VBR slots in each frame. There are advantages, especially in the Remote-to-Base (R-B) ABR transmission, with contiguous allocation of slots for cells in a single ABR burst because of reduced overhead. A round-robin slot allocation policy may be used to prevent long bursts from overloading the channel and increasing the delays for the other VCs. ABR slot assignments are demand-based in contrast to the CBR slot assignments which are periodic. Thus, allocation information comprising the position and duration of the ABR slot assignment must be transmitted to the remote stations whenever these slot assignments are made.

VBR VCs are assigned slots with the aid of a usage parameter control (UPC) based statistical multiplexing algorithm. In order to improve channel utilization, this algorithm is augmented by an 'instantaneous' bit-rate estimation at the base station over an estimation interval whose size is of the order of a MAC superframe discussed above. Note that CBR and VBR calls may be blocked, while ABR virtual circuits are always accepted, subject to source rate flow controls.

Data Link Control

The Data Link Control (DLC) in wireless ATM is designed to provide an additional layer of error protection to ATM services over a radio link. Service class specific retransmission strategies are used to improve error recovery without sacrificing the wireless channel utilization. For ABR, DLC operation follows traditional SREJ ARQ procedures on a burst-by-burst basis, without time limits for completion. On the other hand, for CBR and VBR, each retransmission effort lasts until a time limit that is specified by the application at call set-up time. For CBR and VBR, the channel allocation is periodic; additional ABR allocations are made at the MAC layer to support retransmissions. Since the retransmissions use additional bandwidth, the system can attain a better quality of services without affecting the normal operation of CBR and VBR traffic.

The buffer requirements at the DLC layer vary with the service class. This buffer should be large enough to hold the data cells and any status information that the DLC may require for error recovery. For ABR, the buffer is allocated upon burst arrival and released when the burst is completed. For CBR, the buffer size is determined by the bit-rate of the call and the cell timeout period (which is the time limit for error recovery). This buffer is allocated at call set-up time and is released when the call is completed. For VBR sources, the DLC requires a buffer large enough to hold cells at the peak rate for the cell timeout interval.

Figure 5:
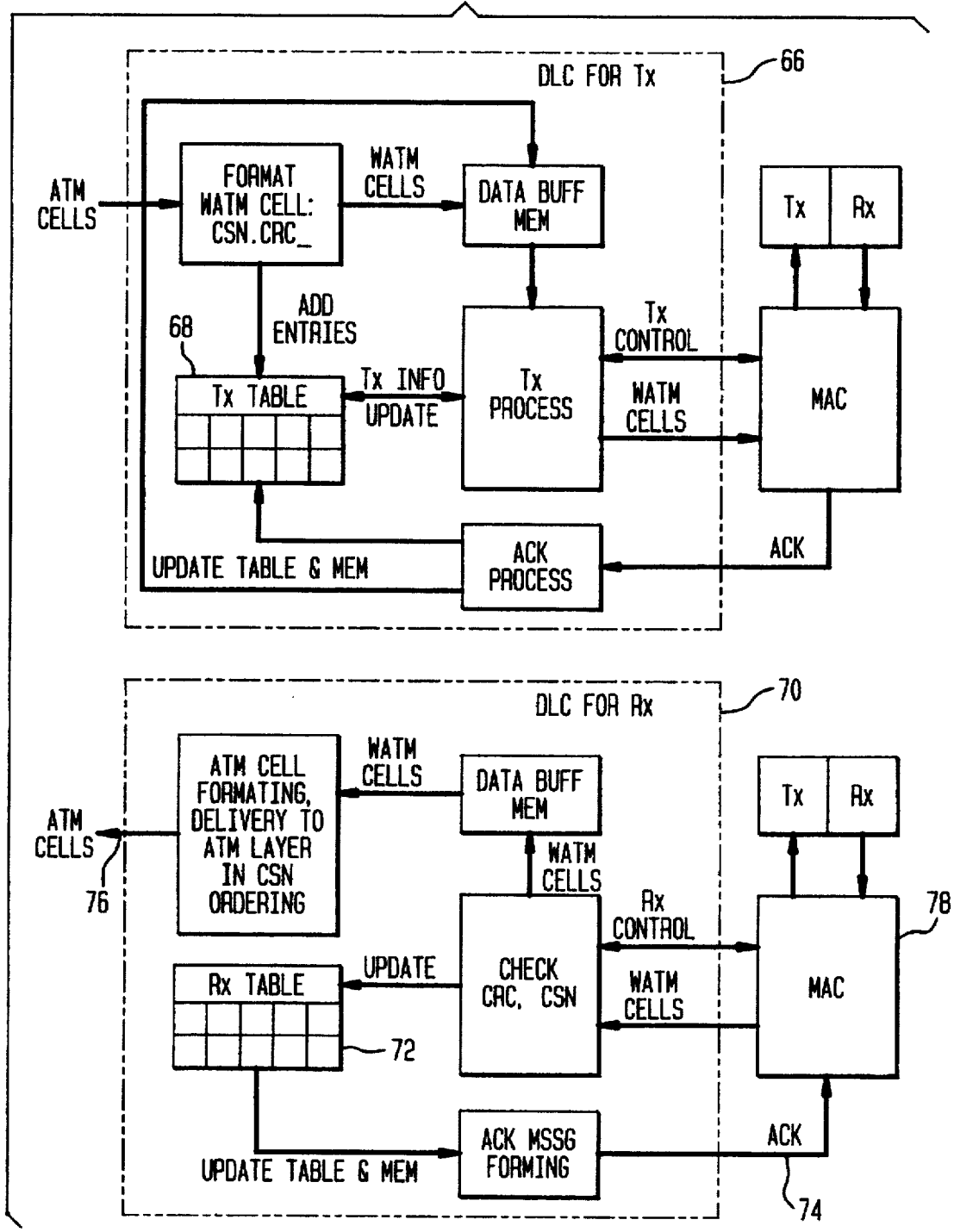
FIG. 5 is a schematic representation of a DLC for transmission and for receiving.

FIG. 5 shows the architecture of preferred DLC layers. The functions of the DLC layer differ depending on the service class (ABR, CBR, or VBR) to which the particular VC belongs. This is due to the fact error recovery strategies are different for each class. For example, ABR VCs wait without any specific time limit to recover lost cells by retransmission. In contrast, CBR VCs impose a time limit for recovery of lost cells. Any cells that are not recovered within the specified time limit are considered lost and the higher layers are responsible for any recovery, if necessary.

Each DLC layer has two independent components, one to handle the DLC functions of all the cells that are to be transmitted out of the station (remote or base), and the other to handle the received cells. They maintain status information of all the cells in the current active burst. In the transmission mode (Tx), this is necessary to determine the cells that need to be transmitted/retransmitted, and those that have been transmitted successfully and hence can be deleted and the buffer released. A cell from an ABR VC is considered to have been successfully transmitted if it has been received without any errors at the receiving station and has been acknowledged. The DLC for Tx 66 maintains a Tx table 68, where the status information of the cells in the buffer are maintained. Cells that are not positively acknowledged by the receiving station are retransmitted at the next available opportunity. In the reception mode (Rx), the DLC for Rx 70 maintains status information in a Rx Table 72 in order to send proper acknowledgments (ACK) 74 to the transmitting station via MAC 78 which can then retransmit all the lost cells. Cells received successfully are sent via link 76 to the ATM layer in a manner appropriate to the traffic class.

Finally, the functions of the DLC layer differ depending on whether it is at the base station or at the remote station. This difference stems from the fact that all the base stations control all the slot allocations (including retransmission requests). Thus, the DLC layers at the base station must maintain additional information in order to submit requests for retransmissions. For the purposes of description, the DLC layers are classified according to (1) their location—base station or remote station, (2) their mode—transmission or reception, and (3) the service class they serve—ABR or CBR.

DLC for ABR Traffic

ABR service can be described as one which can tolerate longer delays but require extremely low cell loss rate. Hence the retransmission strategy for ABR service is not to impose any specific time limit for error recovery. All lost cells are recovered by retransmission. Also, the input to the ABR DLC is assumed to be a burst of cells from the ATM layer. The DLC layers use acknowledgments from the receiving station to update their status information. Multiple cells can be acknowledged simultaneously with the use of a bitmap (FIG. 3B).

In the case of ABR DLC at the base station, all requests for slot allocation (both uplink and downlink) for ABR sources are sent to the S-MAC from the DLC. So the DLC at the base station is responsible for maintaining status information of the cells in the burst, not only for the purposes of acknowledgments, but also to update the S-MAC regarding the number of remaining cells in the current burst in order to account for retransmission of lost cells.

For transmission, cells from the ATM layer are assumed to arrive in bursts. When a burst of L cells arrive at the DLC, the DLC strips off the unused portions of the ATM header, inserts the components of the WATM header, a 16-bit CRC for error detection, and creates a Tx table for the burst. A request is sent to the S-MAC for slot allocation indicating the size of the burst. Upon being notified by the C-MAC of a slot allocation in a frame, for say k cells, the DLC prepares k cells for transmission and transfers them to the C-MAC.

When a burst is active and one or more cells in the burst have been transmitted, the DLC requests the S-MAC to schedule an acknowledgment (ACK) message from the remote station. The receive ACK information is used to update the Tx table by deleting successfully transmitted cells from the buffer and releasing the buffer. An updated request for slot allocation is also sent to the S-MAC to take into account retransmission of lost cells.

For reception, when a new burst of ATM cells arrive at the ABR DLC at the remote station, it transmits a request via a control packet in the R-B control region. When this request is successfully received at the base station ABR DLC, a Rx table is created and a request for slot allocation (for uplink) is sent to the S-MAC. Cells that are received successfully are marked and positively acknowledged. Those with errors are negatively acknowledged (N-ACK) and an updated request for slot allocation is sent to the S-MAC. The DLC also periodically requests the S-MAC to schedule an ACK message to the remote station. Cells are transmitted to the ATM layer in sequence after the radio link DLC header components are deleted and the standard ATM header components have been inserted.

In the case of ABR DLC at the remote station, the DLC at the remote station is more or less identical to that at the base station with a few minor differences. The remote ABR DLC communicates a request for slot allocation to the S-MAC at the beginning of each burst. Hence the state information maintained is somewhat simpler than that at the base station.

For transmission, as in the case of the base station, assume that cells arrive from the ATM layer in bursts. The DLC reformats the cells (remove ATM header, insert WATM header and CRC), creates a Tx table, and sends a request to the MAC layer at the remote station for slot allocation. The MAC layer formats a request packet and transmits it in the B-R control channel. The DLC may optionally specify a timeout interval during which, if slot allocation for this VC is not received, the MAC stops sending the request packet and the DLC sends an error message to the ATM layer. This reduces congestion in both the control channel and the data channel. When the C-MAC at the remote station instructs the DLC of any slot allocation, the DLC prepares cells for transmission and submits them to the C-MAC. It uses the ACK message transmitted by the base station to update the status information in the Tx table.

For reception, a main difference between the base station DLC and the remote station DLC for ABR reception is that the remote station DLC does not have a priori knowledge of the size of the current burst. In fact, it does not know when one burst ends and another one begins. So the input to this layer is a sequence of cells (not bursts) and the ABR Rx DLC is always active and waiting for cells from the base station. Whenever the C-MAC at the remote station instructs the ABR Rx DLC of any slot allocation for an ACK, it formats an ACK message and submits it to the C-MAC for transmission to the base station. The remaining functions are identical to the ABR Rx DLC at the base station.

DLC for CBR Traffic

In the case of CBR DLC, the CBR mode is intended for use with ATM circuit emulation modes for telephony, audio, video, etc. A primary concept is to use finite time DLC procedures to improve the apparent QoS of the wireless network to reach a level more consistent with the wired ATM network backbone. In the CBR mode, the DLC will attempt to correct cell errors within a specified time window (indicated at VC setup). A second concept in the CBR DLC under consideration is that of using additional on-demand bandwidth (supported by the MAC's ABR mode) for retransmission of lost cells, thus maintaining the nominal constant bit-rate stream's bandwidth seen at the ATM interface. Note that, unlike ABR DLC, the CBR DLC maintains a constant end-to-end delay to the ATM network layer and will release the unreceived cells to the ATM layer once the time limit on retransmissions expires.

At the transmitting station, cells arrive from the ATM layer and they can be assumed to arrive in sequence and with almost constant interarrival times (very low cell delay variation). At the receiving station, some cells could be lost due to channel errors and have to be retransmitted. Thus, the cells do not necessarily arrive with constant interarrival times and may not even arrive in sequence. A FIFO buffer is used at the DLC to ensure that the cell delay variation is maintained within acceptable limits. The FIFO buffer is manipulated in such a way that the inter-cell gap between the cells transferred from the CBR DLC to the ATM layer is a constant depending on the bit-rate. Hence the output from the CBR DLC at the receiving station closely resembles the input process at the CBR DLC of the transmitting station. Thus, the FIFO buffer provides a window for error recovery while introducing a fixed delay over the wireless link. The exact mechanism of the FIFO buffer manipulation is described below.

In the case of CBR DLC at the base station, at call setup, the S-MAC allocates slots on a periodic basis for CBR VCs depending on their bit-rate requirements. The DLC for a CBR call then maintains a FIFO buffer, the size of which is determined by the bit-rate of the call and the time window for error recovery.

The DLC for transmission at the base station for CBR service maintains a Tx table for the cells present in the buffer. Cells from the ATM layer are assumed to arrive with almost constant interarrival times (very low cell delay variation). The cells in the buffer are advanced whenever a new cell arrives from the ATM layer. If the oldest cell in the buffer has not been acknowledged positively, then it is deleted from the buffer and no more attempts are made to recover it by retransmission. The DLC also requests the S-MAC for periodic scheduling of ACKs from the remote station. The rate of this request depends on the time window for error recovery. Typically, it would be desirable to have at least one retransmission attempt before the lifetime of the cell in the buffer expires.

The DLC for reception at the base station for CBR service maintains a FIFO buffer and a Rx table for the status of all the cells in the buffer. It also operates the CBR Token Counter algorithm to transfer cells to the ATM layer. The CBR DLC is required to maintain a list and the number of cells that have not been received successfully and request the S-MAC to schedule slots for retransmission in the ABR mode. The remaining functions of the CBR DLC are similar to that of the ABR DLC, the only difference being the CBR DLC has a error recovery window for each cell after which no more attempts are made to recover the lost cell. Thus, the DLC is required to update the S-MAC of any changes to its slot allocation request (for retransmissions). Periodically, an ACK message for the remote station is scheduled by the S-MAC, when the DLC is required to format an ACK message and submit it to the C-MAC for transmission.

The functions of the CBR DLC at the remote station are similar to the DLC at the base station except that the DLC at the remote station does not send requests for slot allocation for error recovery of lost cells.

ABR DLC Protocol Description

Figure 6:
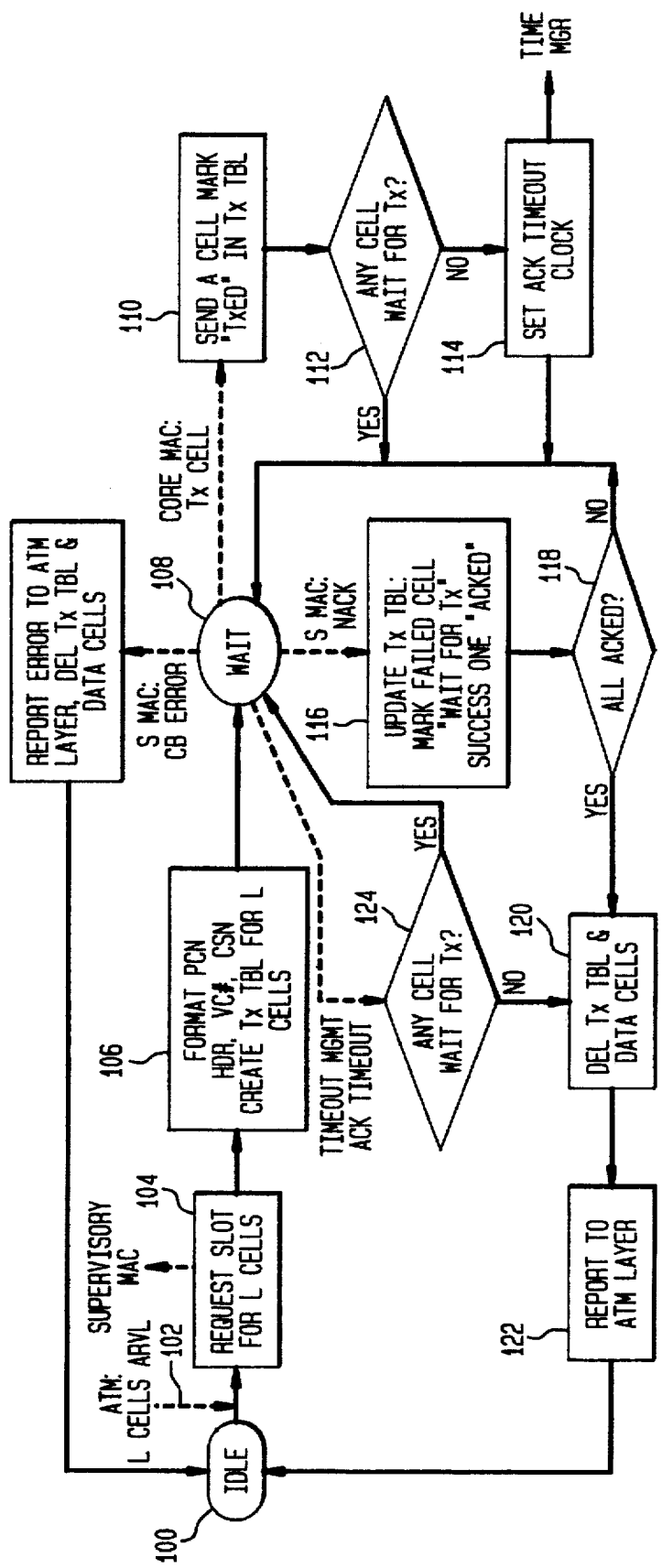
FIG. 6 is a flow diagram of radio data link control for remote ABR transmission.

In FIG. 6 there is shown a flow diagram of the radio data link control for remote ABR transmission. Commencing in the idle state 100, a batch of L cells arrives 102, a request for a slot for the L cells is made 104 and a Supervisory MAC is informed. Formatting PCN, header, VC number, CSN is performed and a transmission table is created for L cells 106. The control then goes into wait status 108. The core MAC sends a transmission cell which is sent and marked "transmitted" in transmission table 110. A decision is made whether any cell is waiting for transmission 112. If yes, the processor returns to the wait state 108. If no, the ACK timeout clock is set 114, and a time management signal is sent and the process returns to the wait state 108. The Supervisory MAC sends a NACK signal when a failed cell is received. The transmission table is updated, a failed cell is marked "wait for transmission" or a successful cell is marked "acked" 116. If not all of the cells are acked 118, the process returns to the wait state 108. If all the cells are marked "acked" 118, the transmission table and data cells are deleted 120. A report is made to ATM layer 122 and the process returns to idle state 100. If there is an ACK timeout, a decision is made whether any cell is waiting for transmission 124. If yes, the process returns to wait state 108. If no, the transmission table and data cells are deleted 120 and the process continues.

In the cell transmission phase, there are four kinds of feedback information the DLC can receive. The DLC will respond according to the received information. These four kinds of feedback information and their resulting processes are:

1. "Channel error or busy" sent by the Supervisory MAC occurs when a channel is too busy or a channel quality is too poor or a system error occurs, or the Supervisory MAC fails to get a channel after several tries. In this case, the DLC cancels its transmission plan, deletes the transmission table, releases data buffers and reports to the ATM layer, then the DLC returns to the "Idle" state of the channel requesting phase.

2. "Transmit k cells" sent by the Core MAC. After the Supervisory MAC successfully requests slots for the transmission, it receives an allocation schedule from the base station, and then puts the allocation information in a frame schedule table. The Core MAC reads the table and sends a transmission request to the DLC. The DLC reads the transmission information, prepares the data, and sends the data to the transmitter. Then the DLC marks the entry of the transmitted cell in the transmission table with "transmitted" and checks if any entry is marked with "wait for transmission." If there is no such cell, the DLC asks a timeout management processor to set a ACK timeout. The reason for setting the timeout is explained below. Then the DLC returns to the "Wait" state again.

3. "NACK Information" is sent by the Supervisory MAC. In each cell there is a 16-bit CRC which is used to detect bit errors of the cell. The base DLC rejects a cell with a CRC error and sends a NACK to indicate to the remote DLC which cell is lost. According to the CSN in the NACK, the DLC marks its entry in the transmission table with "wait for transmission." The NACK information is piggybacked by the control packet which is sent to the Supervisory MAC, then transferred to the DLC. The NACK is carried by group ARQ which provides the information of other cells. For the successfully received cells the DLC marks their entries with "acked." If all cells are "acked", the DLC completes transmission of the batch arrival, deletes the transmission table and data buffer, returns to the "Idle" state of the channel requesting phase, otherwise returns to the "Wait" state.

4. "ACK timeout" is sent by the timeout management processor. The ACK timeout is previously requested by the DLC when all the cells are transmitted. As the timeout management processor returns a timeout signal, the DLC first checks if any cell is marked with "wait for transmission." If so, it returns to the "Wait" state waiting for transmission; and if all the cells are transmitted, it completes the transmission process for this batch arrival and returns to "Idle" state. Before returning to the channel requesting transmission phase, it deletes the transmission table and releases the data buffer. After receiving all the cells, the base sends an ACK. If the remote receives the ACK, it will return to the "Idle" state. If the ACK fails to be received by the remote DLC, the DLC remains in the "Wait" state until ACK timeout occurs. The ACK timeout mechanism provides a way to close the transmission session when the final ACK is lost.

Figure 8:
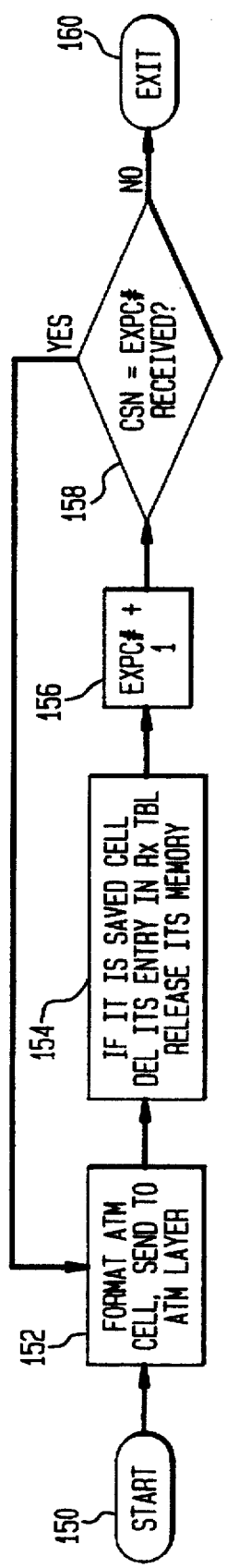
FIG. 8 is a flow diagram of an ATM transfer process.

In the "Idle" state, the DLC may receive two kinds of requests: "receiving cells" and "transmitting ACK packet" from the Core MAC. FIG. 8 is a flow diagram of a radio data link control for remote ABR receiving.

Figure 7:
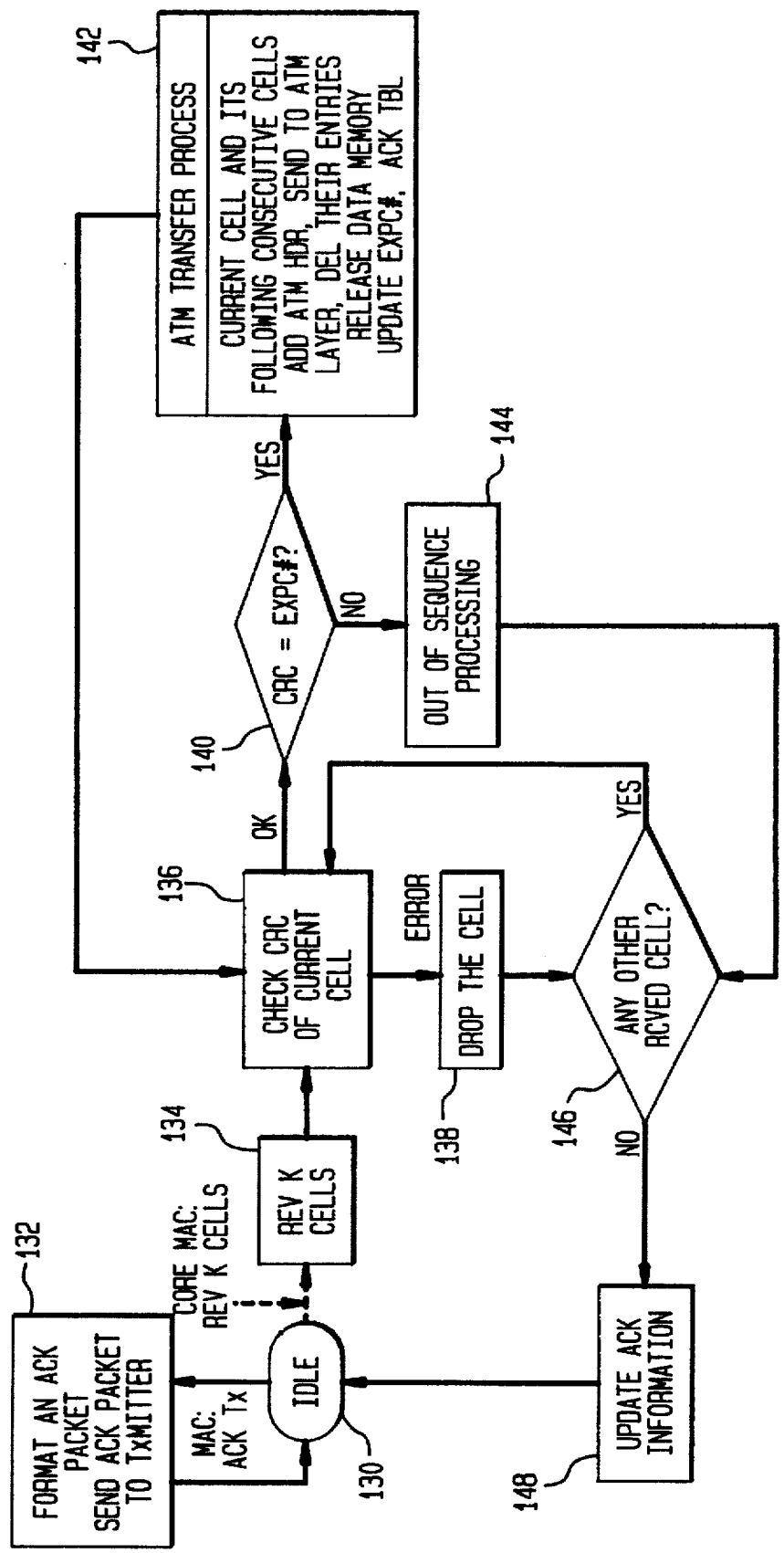
FIG. 7 is a flow diagram of a radio data link control for remote ABR receiving.

Referring to FIG. 7, beginning in its idle state 130, when cells are ready to be transmitted, an ACK packet is formatted and sent to the transmitter 132 and the process returns to the idle state. When receiving k cells 134, the DLC checks the CRC of the current cell 136. If the CRC indicates error, the cell is dropped 138; if there is no error, the CSN of the received cell is compared with the expected CSN number 140, and when they are equal, the cell header is changed to an ATM header and sent to ATM layer 142, along with received cells with consecutive CSN numbers (as described in the ATM transferring procedure in conjunction with FIGS. 8 and 9). Since ATM cells do not have a CSN, they must be sequentially sent to the ATM layer. When the CSN is not equal to the expected CSN number, the arriving cell is out of sequence 144. If it is smaller than the expected number, the DLC saves it in a memory buffer until the expected number equals the CSN. After finishing the processing for all k received cells 146, the DLC updates the ACK information in the ACK table 148. The DLC returns to its idle state 130.

Figure 9:
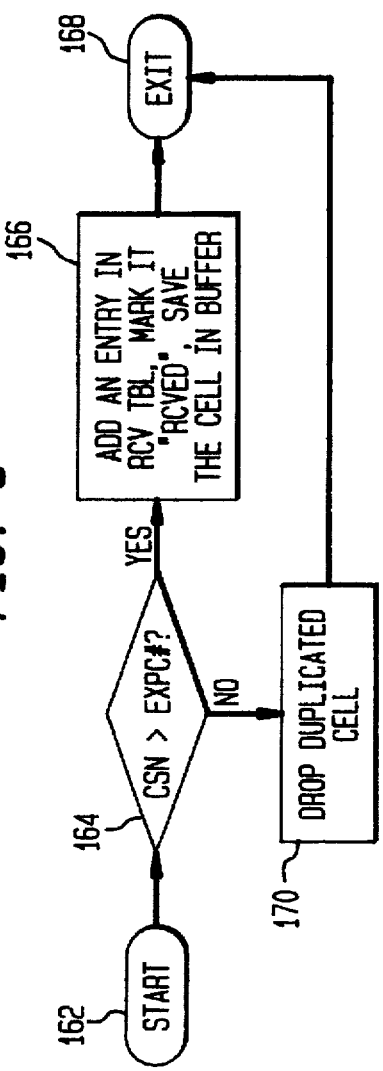
FIG. 9 is a flow diagram of an out-of-sequence process.

FIGS. 8 and 9 are flow diagrams of the ATM transfer process and the out-of-sequence processing in the DLC for remote ABR receiving, respectively. In FIG. 8, beginning at start 150, an ATM cell is formatted and sent to the ATM layer 152. If it is a saved cell, its entry is deleted from the receiver table and its memory is released 154. The expected CSN number, for the next cell, is incremented 156. If the CSN is equal to the expected number received 158, a new ATM cell is formatted and sent to the ATM layer 152. Otherwise, the transfer process exits 160.

FIG. 9 is a flow diagram of an out-of-sequence processing in the DLC for remote ABR receiving. Starting at 162, if the CSN is greater than the expected number 164, an entry is added in the receive table and the cells are marked "Received" and saved in a memory buffer 166 and the process exits 168. If the CSN is not greater than the expected number 164, the duplicate cell is dropped 170 and the process exits 168.

For ACK Packet Transmitting, the base will schedule the remote DLC to send ACK after transmitting data cells. When the Core MAC reads the ACK schedule from the frame schedule table, the Core MAC requests the DLC to prepare an ACK cell and assists the ACK transmission.

Figure 10:
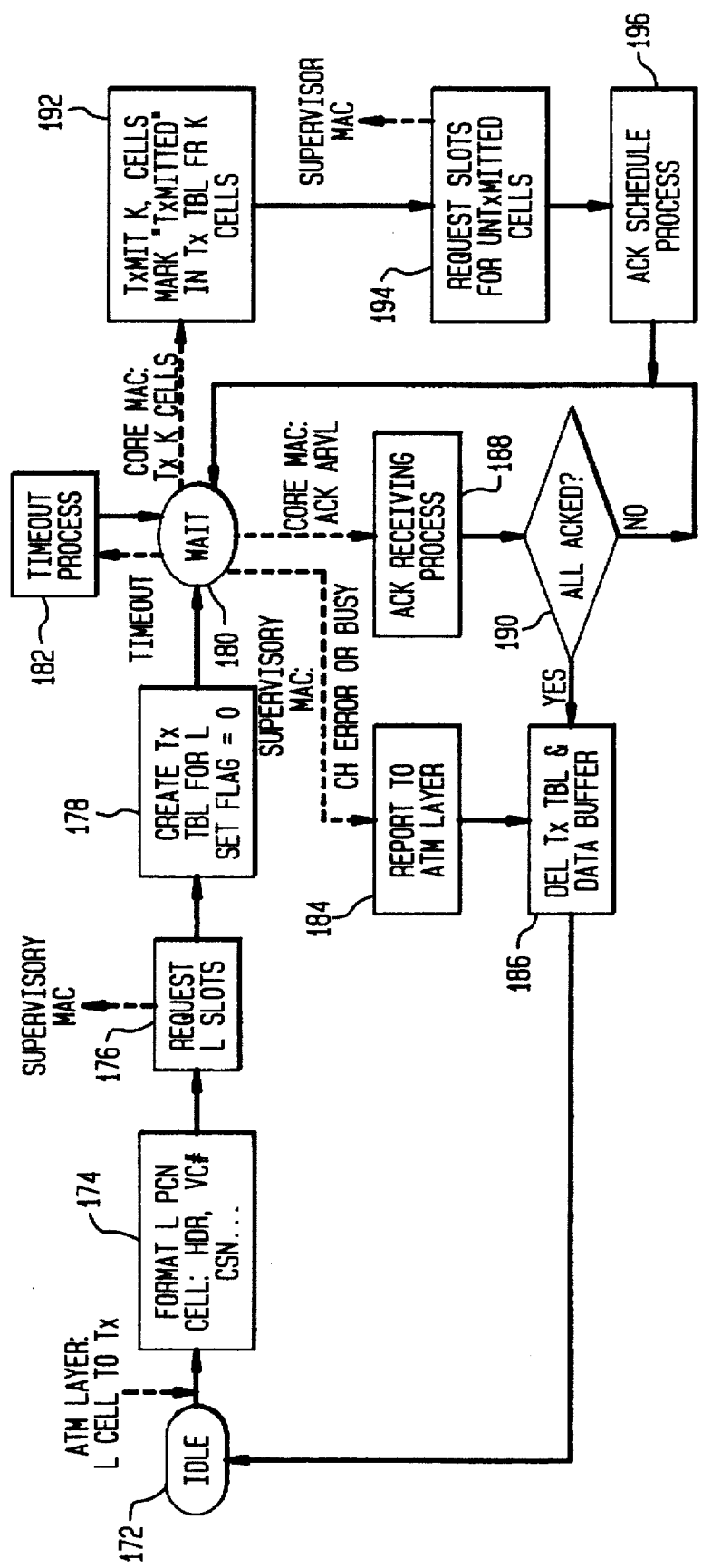
FIG. 10 is a flow diagram of a data link control for base ABR transmission.

A flow diagram of a data link control (DLC) for base ABR transmission is shown in FIG. 10. Beginning in the idle state 172, a request from the ATM layer to transmit L cells causes the formatting 174 of L PCN and a cell including a header, VC number, CSN and the like. A request for L slots 176 is made to the Supervisory MAC. A transmit table for the L cells is created and a flag is set to zero 178. The process enters wait state 180. A timeout process 182 is performed. The timeout process is described in conjunction with FIG. 13. The Supervisory MAC checks for errors and availability and reports to the ATM layer 184. The ATM layer deletes the transmit table and empties the data buffer 186. The process returns to the idle state 172. The core MAC receives and processes the ACK signal 188. A check is made whether all cells are ACKed 190. If yes, the transmit table is deleted and the data buffer is emptied 186. If no, the process returns to the wait state 180. The core MAC transmits k cells which are marked "transmitted" in the transmit table for k cells 192. A request is made to the Supervisory MAC for untransmitted cells 194. The ACK schedule process 196 (shown in FIG. 11) is performed and the process returns to wait state 180.

The DLC for base ABR transmission has the same channel requesting phase process as the remote ABR DLC procedure and a slightly different cell transmission phase than the remote ABR DLC procedure. In the base DLC, the ARQ scheme is not NACK, but rather is ACK. Since the base is responsible for channel allocation, it does not know whether the reception at the remote site was a success or a failure without allocating the remote ACK. The base DLC requests the remote to send an ACK if the number of transmitted cells which wait for ACK reaches a given value or the maximum waiting time of these cells is above a given limit. Similar to the remote DLC, in the "Wait" state of the cell transmission phase, there are four processes:

1. The process for "Channel error or busy" is the same as in the case of the base cell transmission phase.

Figure 11:
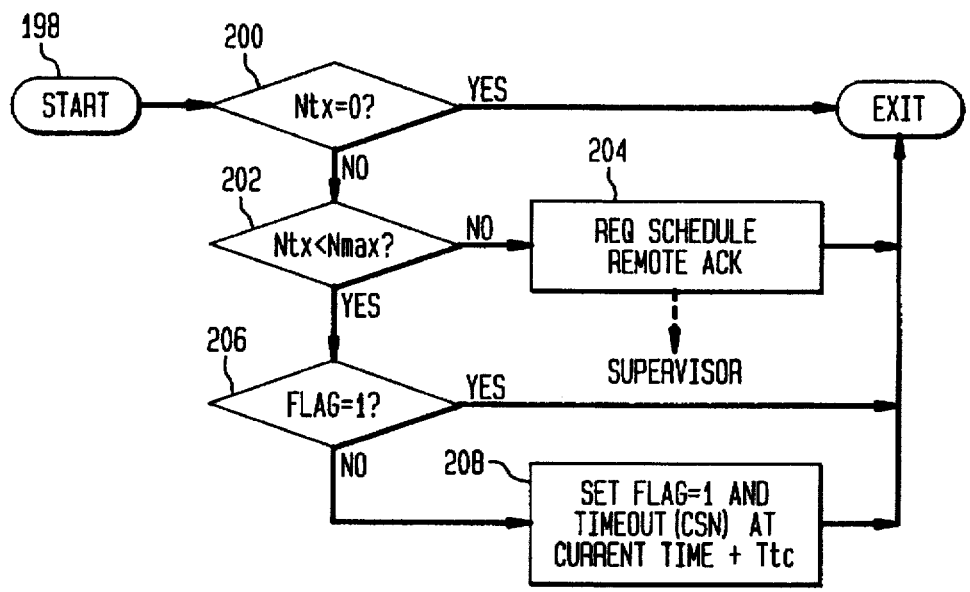
FIG. 11 is a flow diagram of the ACK schedule process for base ABR transmission.

2. Referring to FIG. 11, there is shown a flow diagram of the ACK schedule process. When the Core MAC requests to "transmit cell" at start 198, the DLC sends data cells, then checks the Ntx 200, where Ntx is the number of cells being marked "transmitted" in the transmission table. If Ntx equals or is greater than Nmax 202, the DLC requests the Supervisory MAC to schedule remote ACK immediately 204, if not and no timeout has been scheduled previously 206 (when flag=1, timeout is scheduled), a timeout is scheduled and flag=1 is set 208.

Figure 12:
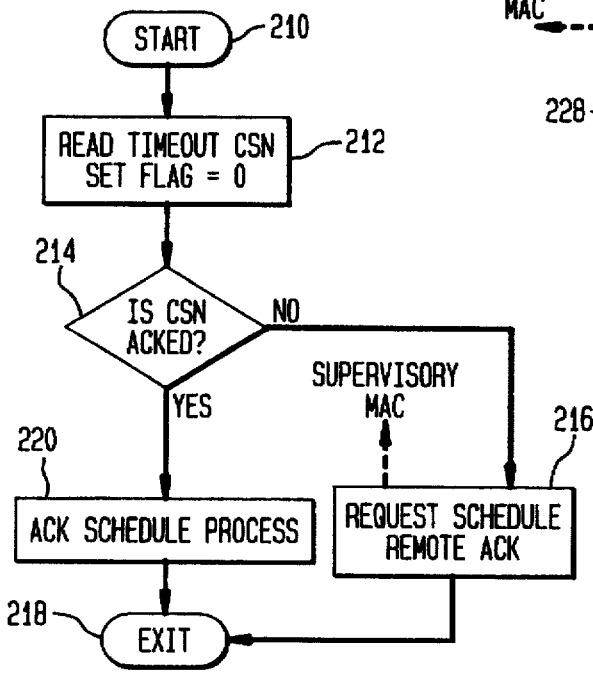
FIG. 12 is a flow diagram of a timeout process portion of the base ABR DLC procedure.

3. Referring to FIG. 12, there is shown a flow diagram of the timeout process. Beginning at start 210, the timeout CSN is read and flag is set to zero 212 (timeout is not scheduled). Then, when timeout occurs, the DLC checks if the CSN associated with the timeout is acked or not 214; if not, it requests scheduling remote ACK 216 immediately, and exits 218. If acked, the ACK Schedule process 220 (FIG. 11) proceeds and then exits 218. The timeout's purpose is different from that for remote DLC where timeout is set for the final ARQ; here timeout is set for periodically scheduling remote ACK.

Figure 13:
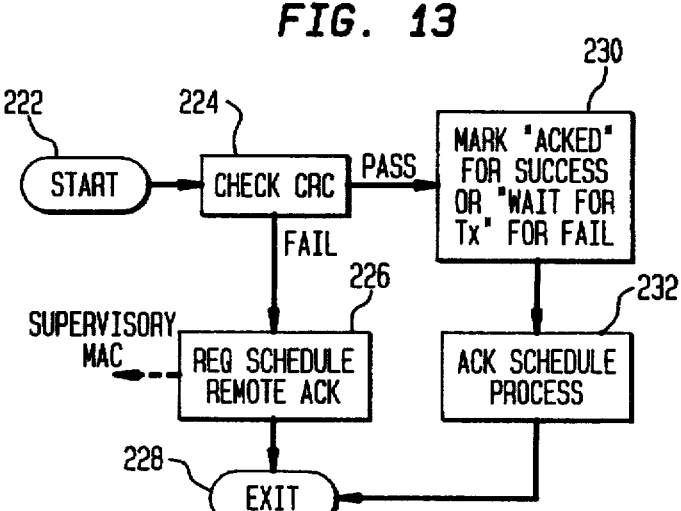
FIG. 13 is a flow diagram of the ACK receiving process portion of the base ABR DLC procedure.

4. A flow diagram of the ACK receiving process is shown in FIG. 13. Beginning at start 222, when the Core MAC requests the DLC to receive an ACK packet, the DLC receives the packet, then checks CRC 224 first. If CRC checking fails, the DLC requests the Supervisory MAC to reschedule a remote ACK 226 immediately and exits 228. If CRC checking passes, the DLC updates the transmission table according to the ACK information 230. There may have been some transmitted cell that has not been ACKed, so the DLC calls the ACK Schedule Process 232 (FIG. 11) before exiting 228.

Figure 14:
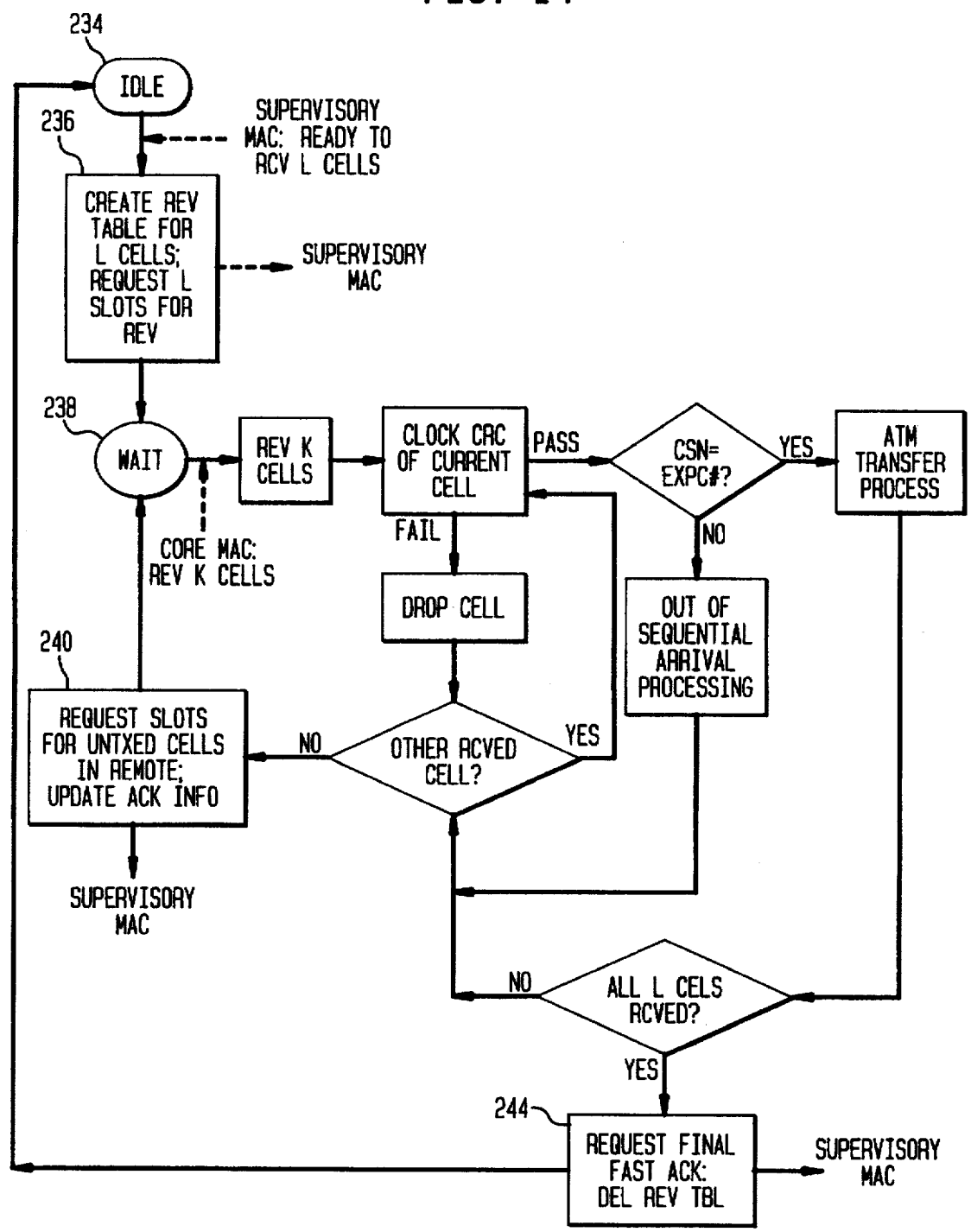
FIG. 14 is a flow diagram of a DLC for base ABR receiving.

FIG. 14 is a flow diagram of a DLC for base ABR receiving. When the base is in its idle state 234 and receives a ABR transmission request from a remote terminal, it informs the DLC that it is ready to receive L data cells. The base DLC then creates a receiving table with L entries 236 and enters the "Wait" state 238 waiting for receiving cells. All entries are marked with "wait for receiving."

ABR base cell receiving is almost the same as that in the remote ABR reception. There are two major differences; the first difference is requesting the Supervisory MAC to send NACK and the second difference is requesting the Supervisory MAC to schedule slots for all unreceived cells. Since the NACK information is piggybacked by the control packets the base sends to the remote, when the base schedules a remote transmission, the control message will bring the NACK information to the remote DLC 236. Thus, there is no NACK packet transmission in the DLC layer. The DLC always requests the number of slots for the current unreceived cells 240. When receiving a requested number of slots, the Supervisory MAC uses the request to overwrite the previous slots instead of adding to them. This makes the control simpler. When all L cells are received 242, the DLC requests the Supervisory MAC to send a fast ACK packet to the remote transmitter 244, and returns to the "Idle" state 234. Actually, the final ACK is not strictly necessary because the remote transmission DLC will automatically close the batch transmission for the L cells by its timeout process. The remainder of the process operates in the same manner as the remote receiving described in conjunction with FIG. 7.

CBR DLC Protocol Description

In the following description, a first-in-first-out (FIFO) buffer based implementation of CBR DLC is described. It will be apparent to those skilled in the art that alternative implementations, such as those known in the art, are also envisioned in the present invention.

In order to understand the FIFO buffer and token counter procedure, assume an arrival rate a (cells/frame), maximum delay d (frames) and a buffer size B which is $$B = da$$

An arrived cell is pushed into the FIFO buffer from one end, and every cell in the buffer is shifted by one, and the last cell at the other end is moved out from the buffer. The FIFO buffer provides a fixed DLC delay of d=B/a, given a constant cell arrival rate. At the transmission site, the FIFO buffer provides an error recovery window, while at the reception site, it is a queue waiting for sequential delivery to the ATM layer.

Define the first position of the FIFO buffer to be the input side, and last position to be the output side. Let N be the cell sequence number (CSN) of the current arrival cell, $M_{max}$ is the maximum CSN of all cells in the FIFO buffer, and $M_{min}$ is the minimal CSN in the buffer (which is in the last position), where $M_{max} - M_{min} + 1$ is the buffer size. The buffer management rules are as follows:

1. If N is in ($M_{max}$, $M_{min}$), the cell fills into the ($M_{max}$ - N+1)-th position;

2. If N<$M_{min}$, it is rejected, and there is no change in the buffer;

3. If N>$M_{max}$, it pushes N-$M_{max}$ cells, and then fills into the first cell position.

Since a cell may be lost in a radio link, the pushing can be delayed, thus making the pushing steps fluctuate. Now, the addition of a token counter procedure will make the pushing smoother.

Let $T_i$ be the value of the token counter at the end of frame i, r be the token rate at end of frame i, the counter value is updated as follows:

$$T_i = \max\{M_{max}, T_{i-1}+r\}$$

if $\lfloor T_i \rfloor > M_{max}$, push the FIFO buffer by $\lfloor T_i \rfloor - M_{max}$ steps, where $\lfloor T_i \rfloor$ is the integer obtained by discarding the fractional part of $T_i$. The above process can push empty cells into the buffer which may be filled later or sent to the ATM layer. Set r to be slightly less than the CBR arrival rate a, and in this case, if a cell arrives late, the buffer will not be overpushed by the token counter, and $T_i$ can be synchronized with arriving CSN. At the end of each frame, the CBR DLC updates the token counter value with the above procedure. If the buffer is pushed by the token counter, the DLC sends whatever is at the output of the FIFO buffer to the ATM layer, and updates the ACK information and receiving table.

In CBR transmission, cell arrivals are from the ATM layer with the interarrival times assumed to have a constant mean value and with relatively low cell delay variance. Hence, in the preferred embodiment, only FIFO buffering in the DLC of CBR transmission is used without the token counter process.

Figure 15:
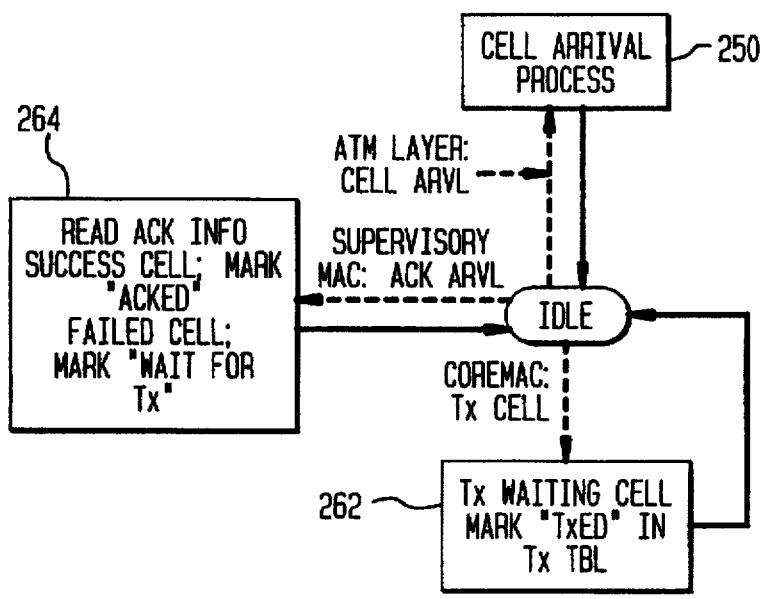
FIG. 15 is a flow diagram for DLC for remote CBR transmission.

The remote DLC layer for remote CBR transmission has three modules, as shown in FIG. 15.

Figure 16:
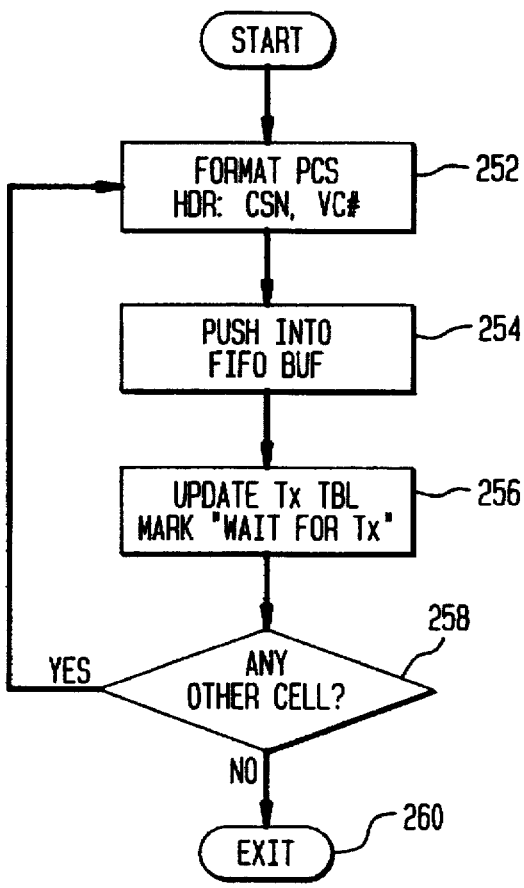
FIG. 16 is a flow diagram for the cell arrival process in remote CBR transmission.

1. The Cell Arrival Process 250 as shown in FIG. 16 handles arriving cells from the ATM layer, and changes the cell headers to WATM format 252, then pushes the cells into the FIFO buffer 254 and updates the transmit table and marks the entry "wait for transmission" 256. A check is made whether there are any other cells 258, until all cells are processed and then the process exits 260.

2. When the DLC receives a cell-transmission request from the Core MAC, it finds the cells that are waiting for transmission in the FIFO buffer, and after transmission marks the cells as "transmitted" in the transmission table 262 (FIG. 15).

3. When the Supervisory MAC sends a request for ACK, the DLC reads the ACK information, marks the cells which are successfully received by the base with "acked" (="success"), and the cells not received with "wait for transmission."

Figure 17:
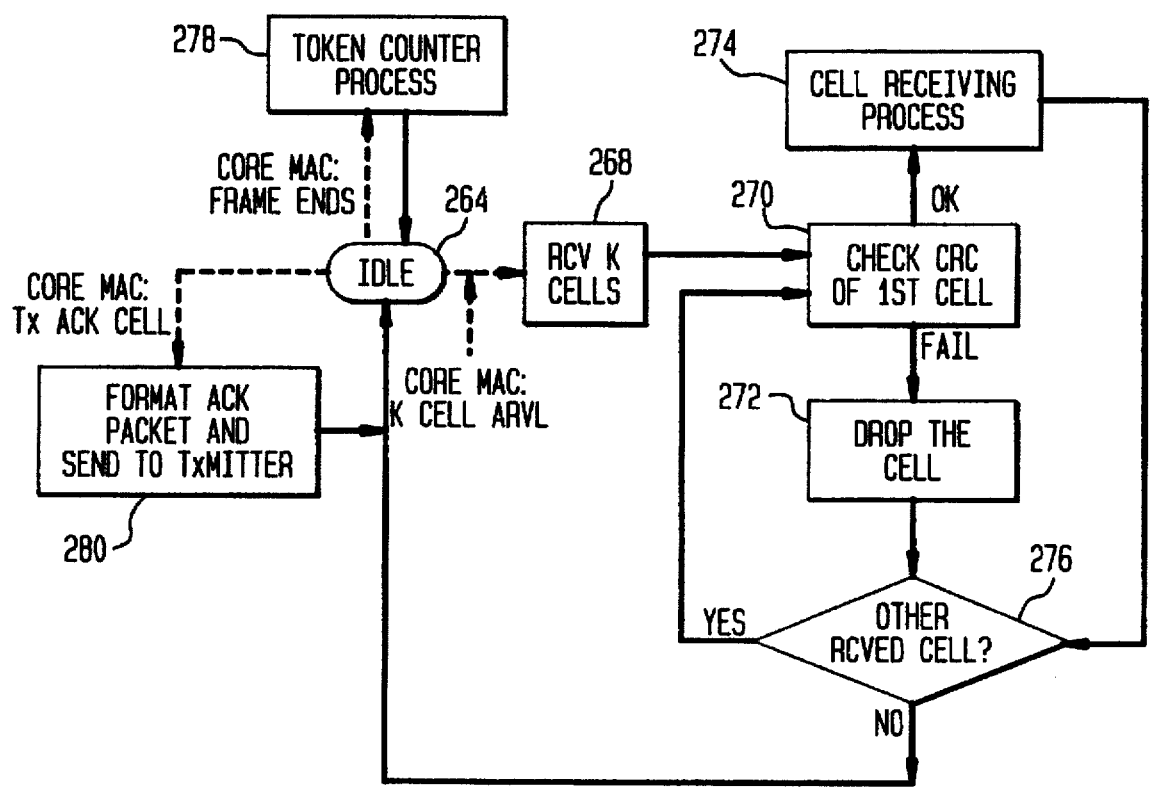
FIG. 17 is a flow diagram for DLC for remote CBR receiving.

A flow diagram of a DLC for remote CBR receiving is shown in FIG. 17. Waiting in the "Idle" state 264, the remote DLC needs to handle three kinds of interrupts:

1. A "k cell arrival" request sent by the Core MAC. For each cell received 268 via the radio channel, the DLC checks its CRC 270; if the CRC check fails, the cell is dropped 272, and if the CRC check is good, the cell is sent to the cell receiving process 274. The process continues until all received cells are checked 276 after which time, the DLC returns to idle state 264. In the cell receiving process, if the CSN of the cell is greater than $M_{max}$, the cell is pushed into the FIFO buffer, and the cells which are pushed out from the buffer are sent to ATM layer; $M_{max}$ and $M_{min}$ are updated such that $M_{max}$=CSN of the cell, marking received cells as "received" and empty cells as "not received;" ACK information is also updated; if the CSN is between $M_{max}$ and $M_{min}$, the cell is entered into the FIFO buffer and marked as "received"; and if the CSN is less than $M_{min}$, the cell is rejected.

2. A "frame end" signal sent by the Core MAC. The DLC will update the token counter 278 to determine if it needs to push the FIFO buffer. The process is described above.

3. A "transmit ACK cell" signal sent by the Core MAC. The format of ACK cells 280 includes a CSN number followed by a bit-map sequence. The CSN points to the minimum of all unreceived cells. In the bit-map sequence, the first bit represents the cell with the given CSN in the ACK cell, the second one CSN+1, and so forth.

Figure 18:
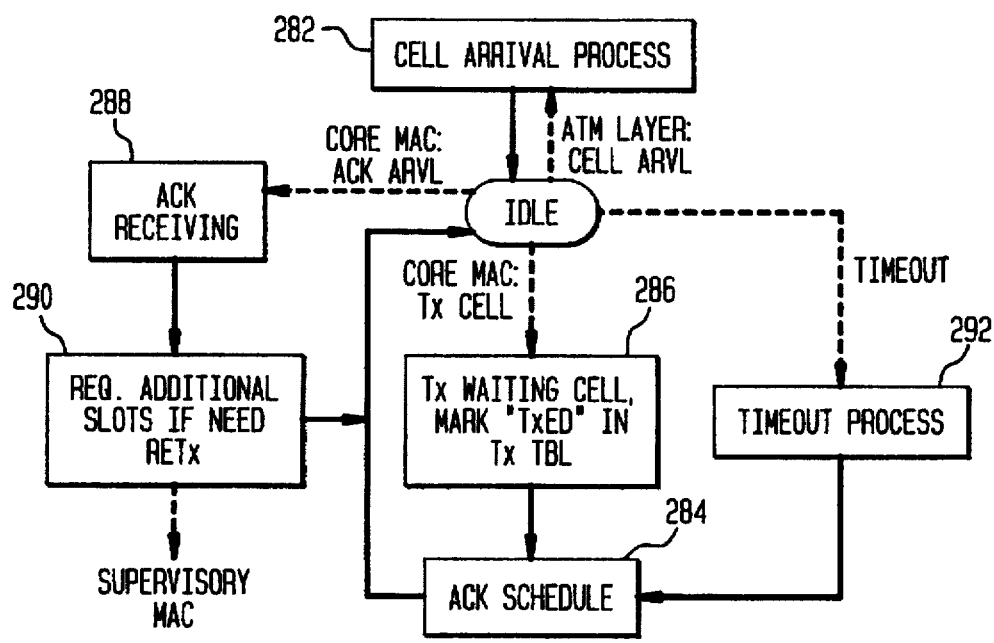
FIG. 18 is a flow diagram for DLC for base CBBL transmission.

Referring to the flow diagram of a DLC for base CBR transmission in FIG. 18, the data link control (DLC) for base CBR transmission comprises:

1. The Cell Arrival Process 282 which is the same as that in remote CBR transmission;

2. In the cell transmission procedure, the ACK Schedule Process 284 is added after a "waiting to be transmitted" cell is marked "transmitted" in the transmission table 286, which is the same as that for base ABR transmission;

3. The ACK is carried by control packet, and the request is issued by the Core MAC. After reading the ACK information 288, it finds any cell that needs to be retransmitted. The base DLC requires an additional action of requesting the Supervisory MAC to allocate additional slots for these cells 290.

4. The Timeout Process 292 is optional. It is the same as that is base ABR transmission. Under CBR arrival condition, the DLC frequently follows the transmission process, and makes a decision about whether an ACK is needed at that time.

Figure 19:
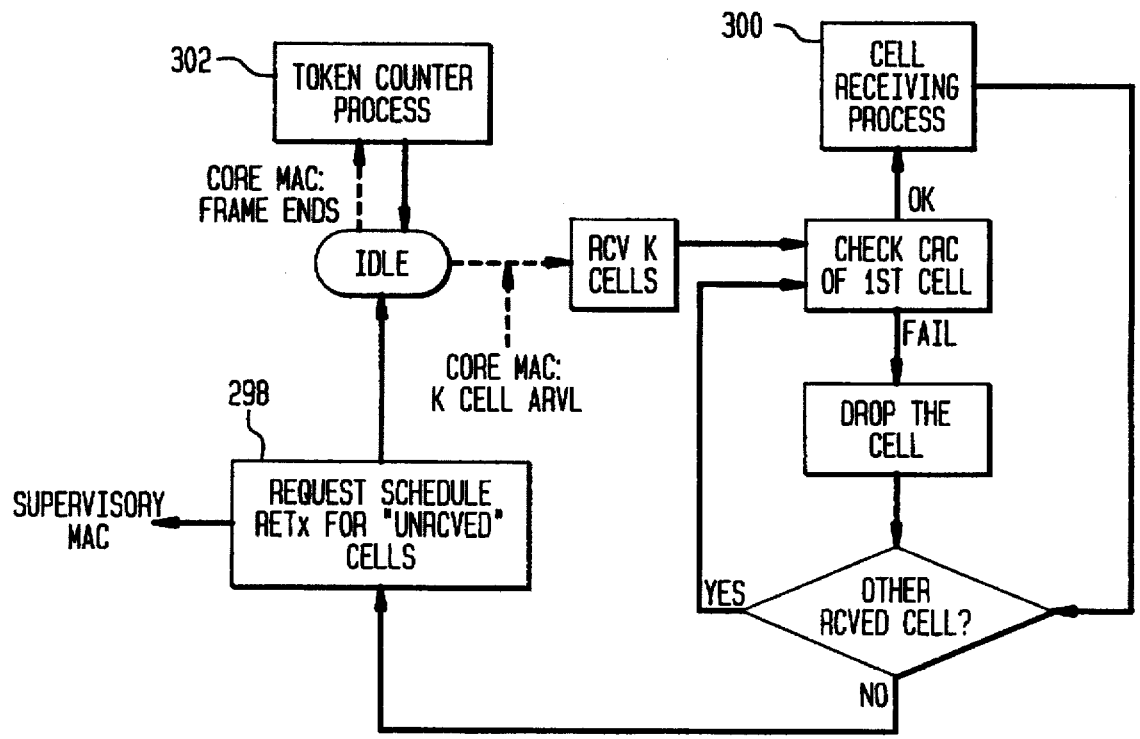
FIG. 19 is a flow diagram of data link control for base CBR receiving.

The flow diagram of a DLC for base CBR receiving shown in FIG. 19 is similar to that for the remote CBR receiving process shown in FIG. 17, except that in the remote CBR receiving requests retransmission for not received cells 298 after completing the cell receiving process 300; also, the remote process does not send ACK packets. In the CBR link, there are default MAC layer slot allocations for regular transmission, so that the base does not need to send an allocation message to the remote terminals every frame. For retransmission, the base informs the remote of an additional DLC slot allocation via control messages. Therefore, it is necessary for the base DLC to find which "not received" cell needs to be transmitted or retransmitted. The DLC first finds the maximum CSN among all received cells, then the not received cells whose CSNs are less than the maximum CSN of received cells are in the retransmission list. The DLC then informs the Supervisory MAC of the CSNs in the retransmission list, and the Supervisory MAC will send slot allocation messages to the remote indicating CSNs for retransmission. Hence, the base DLC does not send ACK packet. If there is no receiving error, there is no feedback information from the base DLC to the remote DLC, and cells waiting in the remote DLC still can be released by the FIFO buffer.

Figure 20:
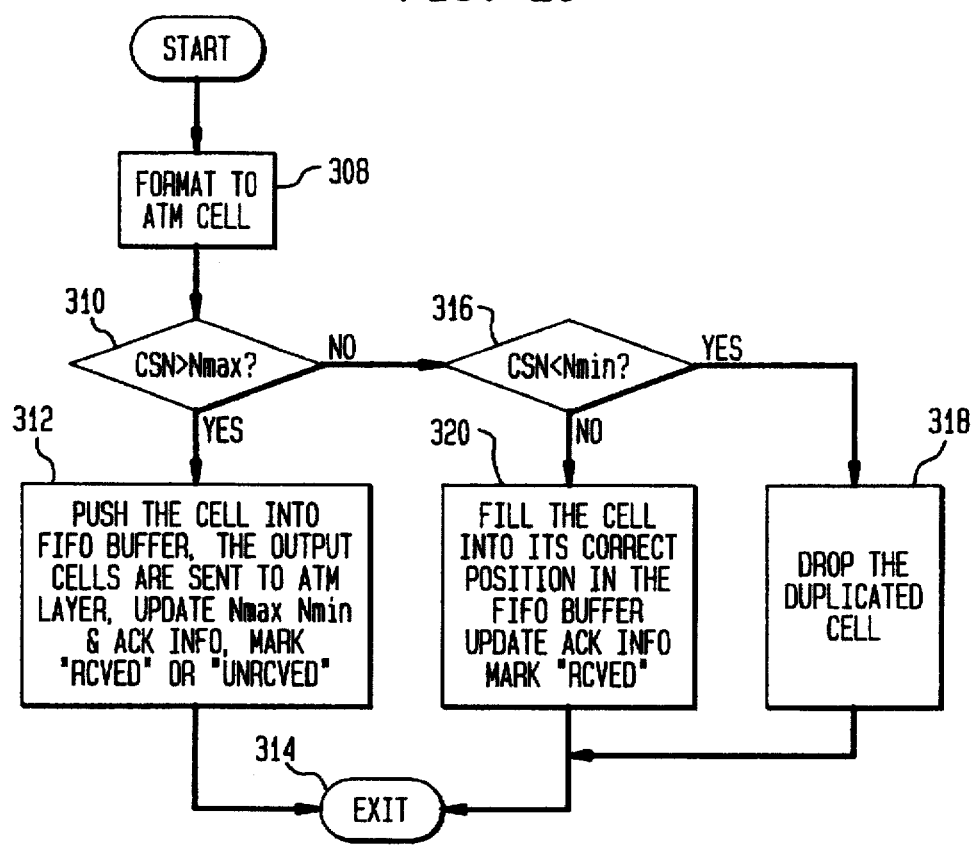
FIG. 20 is a flow diagram of the cell receiving process of the DLC for base CBR receiving.

Referring to FIG. 20, there is shown a flow diagram of the cell receiving process 300. A CBR cell is formatted into an ATM cell 308. A check is made whether CSN>$N_{max}$ 310. If so, the cell is pushed into the FIFO buffer, the output cells are sent to the ATM layer, $N_{max}$, $N_{min}$ and ACK information are updated and the cells are marked "received" or "unreceived" 312 and the process exits 314. If CSN is not greater than $N_{max}$, a check is made whether CSN<$N_{min}$ 316. If yes, the duplicated cell is dropped 318 and process exits 314. If CSN is not less than $N_{min}$, the cell fills its correct position in the FIFO buffer, the ACK information is updated and the cell is marked "received" 320, then the process exits 314.

Figure 21:
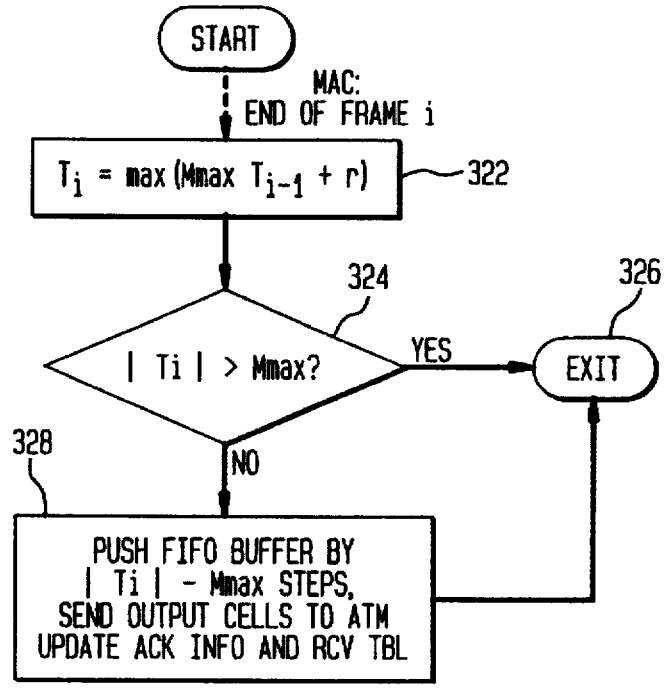
FIG. 21 is a flow diagram of the token counter process of the DLC for base CBR receiving.

FIG. 21 is a flow diagram of the token counter process 302. At the end of frame i, $T_i = \max\{M_{max}, T_{i-1}+r\}$ 322. A decision is made whether $\lfloor T_i \rfloor > M_{max}$ 324. If yes, the process exits 326. If no, the FIFO buffer is pushed, by $\lfloor T_i \rfloor - M_{max}$ steps, output cells are sent to the ATM layer, the ACK information is updated and receiving table is updated 328, then the process exits 326.

While there has been described and illustrated a preferred wireless ATM system and specifically a data link control for use in such a system, it will be apparent to those skilled in the art that variations and modifications are possible without deviating from the broad spirit and principles of the invention which shall be limited solely by the scope of the claims appended hereto.

What is claimed is:

1. A wireless ATM communication system including a base station and at least one remote station for transmitting data packets between a base station and a remote station via wireless link comprising:

a base station;

at least one remote station;

data link control means for controlling transmission of data packets between said base station and said remote station via wireless link comprising means for replacing a standard ATM header with a wireless ATM header and including ACK message format for wireless ATM transmission and reception;

buffer means for storing cells and status information;

table means for causing cells unacknowledged by a receiving station to be retransmitted; and where in ABR mode, said buffer means and said table means preallocate slots at a medium access control means for retransmission of lost cells.

2. A wireless ATM communication system as set forth in claim 1, where said ACK message format includes a bitmap.

3. A wireless ATM communication system including a base station and at least one remote station for transmitting data packets between a base station and a remote station via wireless link comprising:

a base station;

at least one remote station;

data link control means for controlling transmission of data packets between said base station and said remote station via wireless link comprising means for replacing a standard ATM header with a wireless ATM header and including ACK message format for wireless ATM transmission and reception;

buffer means for storing cells and status information;

table means for causing cells unacknowledged by a receiving station to be retransmitted; and where in CBR/VBR mode, said buffer means includes a FIFO buffer and retransmission of cells at a medium access control means uses on-demand bandwidth in ABR mode.

4. A wireless ATM communication system as set forth in claim 3, further including a token counter means for controlling said FIFO buffer.

5. A wireless ATM communication system as set forth in claim 3, where said ACK message format includes a bitmap.

* * * * *